US012434945B2

(12) United States Patent
Ijäs et al.

(10) Patent No.: US 12,434,945 B2
(45) Date of Patent: Oct. 7, 2025

(54) ELEVATOR CONSTRUCTION ARRANGEMENT AND A METHOD

(71) Applicant: Kone Corporation, Helsinki (FI)

(72) Inventors: Mika Ijäs, Helsinki (FI); Matti Räsänen, Helsinki (FI); Mikko Kukkola, Helsinki (FI); Markku Haapaniemi, Helsinki (FI); Janne Laine, Helsinki (FI); Otto Lanz, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 18/806,894

(22) Filed: Aug. 16, 2024

(65) Prior Publication Data

US 2024/0400350 A1 Dec. 5, 2024

Related U.S. Application Data

(63) Continuation of application No. PCT/EP2022/054950, filed on Feb. 28, 2022.

(51) Int. Cl.
*B66B 19/00* (2006.01)
*B66B 9/00* (2006.01)
(Continued)

(52) U.S. Cl.
CPC ................ *B66B 19/00* (2013.01); *B66B 9/00* (2013.01); *E04G 3/32* (2013.01); *E04G 2003/286* (2013.01)

(58) Field of Classification Search
CPC .. B66B 11/0005; B66B 11/043; B66B 19/005
See application file for complete search history.

(56) References Cited

U.S. PATENT DOCUMENTS

2014/0000987 A1* 1/2014 Peacock .................. B66B 9/187
187/414

FOREIGN PATENT DOCUMENTS

EP 2993153 A1 3/2016
EP 3388379 A1 10/2018
(Continued)

OTHER PUBLICATIONS

International Search Report for International Application and Written Opinion of the International Searching Authority for International Application No. PCT/EP2022/054950 dated Oct. 20, 2022.

*Primary Examiner* — Diem M Tran
(74) *Attorney, Agent, or Firm* — Harness, Dickey & Pierce, P.L.C.

(57) ABSTRACT

An elevator construction arrangement comprises: a hoistway having a bottom section, a top section and optionally at least one intermediate section between the bottom and top sections in a building, an elevator car, a counterweight, car guide rails for guiding the car, counterweight guide rails for guiding the counterweight, an elevator hoisting machine and a suspension roping arranged to suspend the car and the counterweight during construction time use of the elevator, at least one protection deck mounted within the hoistway during elevator installation in a section of the hoistway, an installation platform configured to be guided on car guide rails during installation of at least one hoistway section, a hoist device configured to hoist a working platform in the bottom section and configured to hoist the working platform in hoistway sections above the bottom section, the hoist device preferably comprises a man riding hoist attachable to the car or the installation platform, and a hoist rope attachable to the car or the installation platform and movable with the hoist device during the elevator installation, a hoisting point configured to support the working platform via the hoist device and the hoist rope. During the elevator instal-
(Continued)

lation in the bottom section the hoisting point is configured to be mounted to a first protection deck, and the working platform guided on the car guide rails is configured to be used as an installation platform, and after each section elevator installation, the car is during construction time use configured to be moved by the elevator hoisting machine suspending the car and the counterweight together with the suspension roping, and during construction time use of the car, the installation platform is configured to be used as installation platform for an above section installation. A method for installing an elevator during construction of a building.

15 Claims, 7 Drawing Sheets

(51) Int. Cl.
*E04G 3/28* (2006.01)
*E04G 3/32* (2006.01)

(56) References Cited

FOREIGN PATENT DOCUMENTS

| | | | | | |
|---|---|---|---|---|---|
| EP | 3816088 | A1 | | 5/2021 | |
| EP | 3872019 | A1 | | 9/2021 | |
| WO | WO-2015003965 | A1 | * | 1/2015 | ............. B66B 19/00 |
| WO | 2016/034757 | A1 | | 3/2016 | |
| WO | WO-2018099761 | A1 | * | 6/2018 | ......... B66B 11/0005 |
| WO | WO-2019068469 | A1 | * | 4/2019 | ............. B66B 19/00 |
| WO | WO-2020088979 | A1 | * | 5/2020 | ............. B66B 19/00 |
| WO | WO-2021259969 | A1 | * | 12/2021 | ............. B66B 19/00 |

* cited by examiner

ELEVATOR CONSTRUCTION ARRANGEMENT AND A METHOD

CROSS-REFERENCE TO RELATED APPLICATION

This application is a continuation of PCT International Application No. PCT/EP2022/054950 which has an International filing date of Feb. 28, 2022, the entire contents of which are incorporated herein by reference.

FIELD OF THE INVENTION

The invention relates to an elevator construction arrangement and a method for installing an elevator during construction of a building.

BACKGROUND OF THE INVENTION

The construction of an elevator may especially in high-rise buildings be done in parts along the height of the hoistway. The guide rails and the landing doors may first be installed to a first height in the hoistway, then to a second height etc. A construction time elevator may then be operated on the already installed lower portion of the hoistway while the construction of the elevator is going on in a higher portion of the hoistway.

An installation platform may be used for the construction of the elevator above the construction time elevator operating in the lower portion of the hoistway.

With a traditional elevator installation method, the installation can start only when the roof is closed.

SUMMARY OF THE INVENTION

An object of the present invention is to present an improved elevator construction arrangement and an improved method for installing an elevator during construction of a building.

It is brought forward a new elevator construction arrangement comprising:

a hoistway having a bottom section, a top section and optionally at least one intermediate section between the bottom and top sections in a building, an elevator car, a counterweight, car guide rails for guiding the car, counterweight guide rails for guiding the counterweight, an elevator hoisting machine and a suspension roping arranged to suspend the car and the counterweight during construction time use of the elevator, at least one protection deck mounted within the hoistway during elevator installation in a section of the hoistway, an installation platform configured to be guided on car guide rails during installation of at least one hoistway section, a hoist device configured to hoist a working platform in the bottom section and configured to hoist the working platform in hoistway sections above the bottom section, the hoist device preferably comprises a man riding hoist attachable to the car or the installation platform and a hoist rope attachable to the car or the installation platform and movable with the hoist device during the elevator installation, a hoisting point configured to support working platform via the hoist device and the hoist rope; wherein during the elevator installation in the bottom section the hoisting point is configured to be mounted to a first protection deck, and the working platform guided on the car guide rails is configured to be used as an installation platform, after each section elevator installation, the car is during construction time use configured to be moved by the elevator hoisting machine suspending the car and the counterweight together with the suspension roping, and during construction time use of the car, the installation platform is configured to be used as installation platform for an above section installation.

In a preferred embodiment, the car is configured to be used in construction time use after the hoisting point and the hoist device are removed from the bottom section, or after the hoisting point, the hoist device and the installation platform are removed from the installed hoistway section.

In a preferred embodiment, after the bottom section installation, the car is during construction time use configured to be moved in the bottom section of the hoistway by the elevator hoisting machine which is installed at a top of the bottom section and supported by the car guide rail, the elevator hoisting machine suspending the car and the counterweight together with the suspension roping, after the hoist device, or after the hoist device and the installation platform, is removed from the bottom section.

In a preferred embodiment, during the elevator installation in the at least one intermediate section the hoisting point is configured to be mounted to an upper second protection deck and the installation platform is configured to be used as installation platform.

In a preferred embodiment, after the intermediate section installation, the car is during construction time use configured to be moved in the intermediate section by the elevator hoisting machine which is installed at a top of the intermediate section and supported by the car guide rail, the elevator hoisting machine suspending the car and the counterweight together with an extended suspension roping, after the hoist device and the installation platform are removed from the intermediate section.

In a preferred embodiment, during the elevator installation in the top section, the hoisting point is configured to be moved to a ceiling of the hoistway.

In a preferred embodiment, the protection deck comprises a material hoist configured to hoist construction material below the protection deck.

In a preferred embodiment, the material hoist is configured to hoist car guide rails and counterweight guide rails and other heavy elevator components.

In a preferred embodiment, the car and/or the installation platform is configured to lift guide rails and other heavy elevator components.

In a preferred embodiment, the arrangement comprises an overspeed governor to be suspended by a protection deck during the bottom section and intermediate section installations and by a structure of the building such as the ceiling or a machine room during the top section installation.

In a preferred embodiment, guide rails are configured to be installed through the protection deck, particularly through a cover comprised by the protection deck.

In a preferred embodiment, the elevator installation in the top section is started after the building is in full height.

In a preferred embodiment, the elevator installation in the top section is started after the ceiling is closed.

In a preferred embodiment, in case of a machine-roomless elevator, the elevator hoisting machine installed at a top of the hoistway is supported by a car guide rail, and rope suspenders for fixing ends of the suspension roping are supported by the guide rails.

In a preferred embodiment, in case of a machine room elevator the elevator hoisting machine used for moving the elevator car for full height of the elevator travel and rope suspenders for fixing an end of the suspension roping are installed in a machine room.

In a preferred embodiment, the hoisting point comprises a connecting member equipped with an eye/opening or a corresponding means of attachment for a hook or a corresponding gripping member supporting a diverting pulley to rotatably guide and support the hoist rope.

In a preferred embodiment, in case of the machine-roomless elevator, the overspeed governor is moved from the ceiling to the car guide rail opposite the car guide rail supporting the elevator hoisting machine.

In a preferred embodiment, the elevator hoisting machine is a construction time elevator hoisting machine or a final elevator hoisting machine to be finally installed in the top section of the hoistway or a machine room.

In a preferred embodiment, the installation platform comprises at least one guide rail magazine for receiving guide rail elements to be used in the installation of guide rails, preferably the at least one guide rail magazine is adjustable between a retracted position and a pulled-out position in relation to decks of the installation platform.

In a preferred embodiment, the working platform comprises the car or at least parts of the car to be guided on the car guide rails.

In a preferred embodiment, the working platform comprises the installation platform.

It is also brought forward a new method for installing an elevator during construction of a building comprising

- providing an elevator car, a counterweight, car guide rails for guiding the car, counterweight guide rails for guiding the counterweight, an elevator hoisting machine and a suspension roping for suspending the car and the counterweight during construction time use of the elevator,
- mounting at least one protection deck within a hoistway having a bottom section, a top section and an optional at least one intermediate section between the bottom and top sections in a building, for an elevator section installation,
- providing an installation platform to be guided on car guide rails during installation of at least one hoistway section,
- providing a hoist device,
- guiding a working platform on car guide rails and the counterweight on counterweight guide rails installed at the bottom of the hoistway,
- attaching to the working platform the hoist device preferably comprising a man riding hoist and a hoist rope,
- providing a hoisting point to support the working platform via the hoist device and the hoist rope, wherein the method comprises
- mounting the hoisting point to a first protection deck for the bottom section elevator installation, and installing elevator components in the bottom section using the working platform as an installation platform,
- after each section elevator installation, moving the car during construction time use by the elevator hoisting machine suspending the car and the counterweight together with the suspension roping, and
- during construction time use of the car, using the installation platform as installation platform for an above section installation.

In a preferred embodiment, the method comprises moving the car during construction time

- after the hoisting point and the hoist device are removed from the bottom section, or
- after the hoisting point, the hoist device and the installation platform are removed from the installed hoistway section.

In a preferred embodiment, the method comprises installing the elevator hoisting machine, supported by the car guide rail at a top of the bottom section, and installing the suspension roping to suspend the car and the counterweight, and moving the car during construction time use in the bottom section, after the hoist device, or after the hoist device and the installation platform, is removed from the bottom section.

In a preferred embodiment, during the elevator installation in the at least one intermediate section, mounting the hoisting point to an upper second protection deck, attaching to the installation platform the hoist device and the hoist rope, and using the installation platform as installation platform.

In a preferred embodiment, after the intermediate section installation, installing the elevator hoisting machine, supported by the car guide rail at a top of the intermediate section, and installing an extended suspension roping to suspend the car and the counterweight, and moving the car during construction time use in the intermediate section, after the hoist device and the installation platform are removed from the intermediate section.

In a preferred embodiment, during the elevator installation in the top section, moving the hoisting point to a ceiling of the hoistway.

In a preferred embodiment, the method comprises hoisting construction material below the protection deck by a material hoist comprised by the protection deck.

In a preferred embodiment, the method comprises hoisting car guide rails and counterweight guide rails and other heavy elevator components by the material hoist.

In a preferred embodiment, the method comprises hoisting guide rails and other heavy elevator components by the car and/or the installation platform.

In a preferred embodiment, the method comprises suspending an overspeed governor by the protection deck during the bottom section and intermediate section installations and by a structure of the building such as the ceiling or a machine room during the top section installation.

In a preferred embodiment, the method comprises installing guide rails through the protection deck, particularly through a cover comprised by the protection deck.

In a preferred embodiment, the method comprises starting the elevator installation in the top section after the building is in full height.

In a preferred embodiment, the method comprises starting the elevator installation in the top section after the ceiling is closed.

In a preferred embodiment, in case of a machine-roomless elevator, supporting the elevator hoisting machine at a top of the hoistway by a car guide rail, and supporting rope suspenders for fixing ends of the suspension roping by the guide rails.

In a preferred embodiment, in case of a machine room elevator, installing the elevator hoisting machine used for moving the elevator car for full height of the elevator travel and rope suspenders for fixing an end of the suspension roping in a machine room.

In a preferred embodiment, in case of a machine-room-less elevator, moving the overspeed governor from the ceiling to the car guide rail opposite the car guide rail supporting the elevator hoisting machine.

In a preferred embodiment, the method comprises receiving guide rails to be used in the elevator installation by at least one guide rail magazine comprised by the installation platform, preferably adjusting the at least one guide rail magazine between a retracted position and a pulled-out position in relation to decks of the installation platform.

In a preferred embodiment, the method comprises taking a below section elevator out of construction time use to extend the travel of the elevator by moving below section top components to a headroom of an above section.

In a preferred embodiment, taking the below section elevator out of construction time use comprises removing the suspension ropes, the first hoisting machine and a headroom electrification from the below section. In a preferred embodiment, the method comprises using the car or at least parts of the car as the working platform to be guided on the car guide rails.

In a preferred embodiment, the method comprises using the installation platform as the working platform.

The method and the arrangement described are preferred for midrise buildings. In such a sectional installation method and arrangement, the elevator is installed in phases for construction time use CTU. The installation can start when the building has reached an agreed height.

The construction of the building can continue above a CTU elevator which is operating in the bottom section or a below section of the hoistway. Simultaneously the elevator installation in the same hoistway can be continued above the operating CTU elevator, and when the time is right, a conversion into the CTU elevator with extended travel or the final elevator can be made.

The elevator installation is possible when the building is raising up, already before a hoistway ceiling is closed and corresponding lifting or hoisting points for elevator installation are in place in the ceiling.

The elevator in the bottom section and potential intermediate sections can be used during construction while the building is still under construction, at the stage when the building starts its busiest phase of work, i.e. the floors are started to be finished and furnished, allowing materials and persons to be transported effectively inside the building, protected from the weather, and not having to pass as much on the stairs, resulting in a significant reduction in the potential number of accidents at work.

During the construction of the building, site logistics can be improved for the transport of people and goods, and based on better site logistics shorter construction time can be achieved. This means that the finalized elevator can be delivered to the customer earlier.

Using an installation platform and a protection deck enables earlier availability of the continued installation of elevators.

When the building is raising, protection decks can be installed which provide lifting for hoisting points for a hoist device such as a man riding hoist and an overspeed governor. The use of protection decks also protects the installers inside the hoistway. The use of a protection deck also provides an installation base at the bottom areas of the intermediate and top sections.

Once the bottom section is installed, the elevator can be put into CTU operation, and since the guide rails can be installed and moved through the protection deck, the installation above the protection deck can be continued for a potential intermediate section or an uppermost section, also called a top section.

The elevator in the bottom section and potential intermediate sections can be used during construction while simultaneously the elevator installation can continue in the same hoistway. When the CTU elevator is operated in the bottom section or the intermediate sections, the installation can continue with the installation platform in the section above the CTU elevator.

Thus, a further protection deck for supporting the installation platform can be installed in an intermediate section above the previous finished bottom section or a previous finished intermediate section. Once the intermediate section is installed and the installation platform is removed from the hoistway, the extension of the elevators travel can begin, with the suspension ropes being replaced or extended to allow for a longer travel and the motor and other components being moved to a temporary headroom to a top of the intermediate section. This will allow a longer travel for the elevator in CTU. The jump relating to the intermediate section can be done as many times as the customer needs.

Once the top section is installed and the installation platform is removed from the hoistway, the final extension of the elevators travel can begin, with the suspension ropes being replaced or extended to allow for a longer travel and the motor and other components being moved to a headroom at the top of the hoistway in case of a machine-room-less elevator or to a machine room above the hoistway in case of a machine room elevator. This will allow a longer travel for the elevator in CTU.

BRIEF DESCRIPTION OF THE DRAWINGS

The invention will in the following be described in greater detail by means of preferred embodiments with reference to the attached drawings, in which.

DETAILED DESCRIPTION

Figure 1:
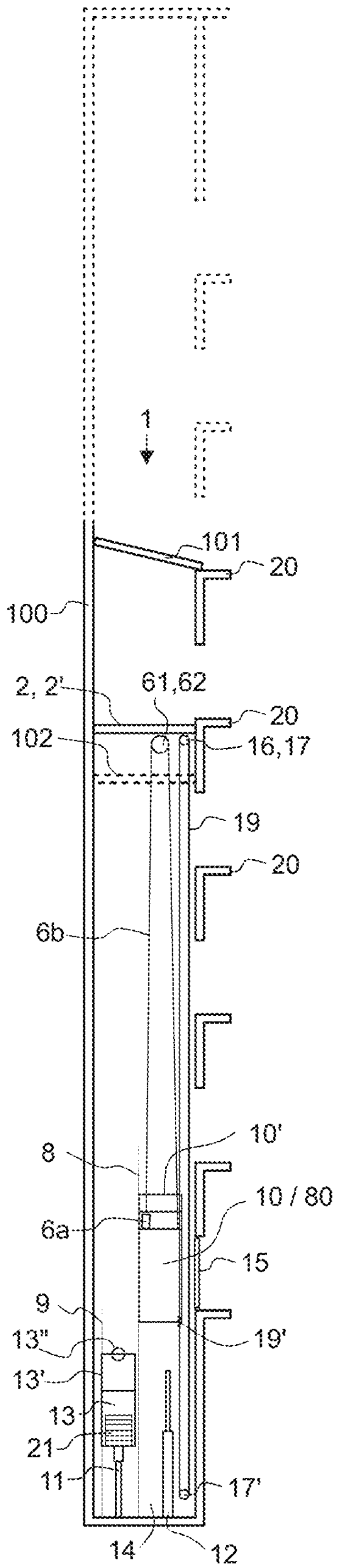
FIG. 1 shows an arrangement for installing an elevator during construction of a building using a working platform such as an elevator car as an installation platform.

FIG. 1 shows an arrangement for installing an elevator during construction of a building 100 at an initial stage. The installation of the elevator may start when the building core has reached agreed height before the roof 1' of a hoistway 1 is closed.

A weather deck 101 and a temporary working deck 102 may be installed in the elevator hoistway 1 preferably by the builder. The weather deck 101 may be an inclined waterproof deck which seals the hoistway 1 to keep it clean and dry.

The elevator installers may install a protection deck 2 from the working deck 102.

Figure 2:
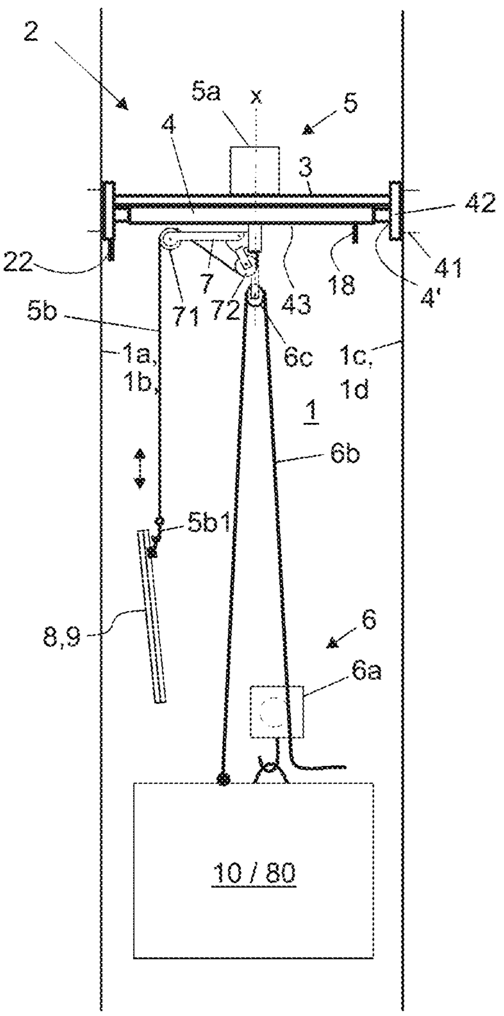
FIG. 2 shows schematically a side view of a protection deck supporting working platform such as the elevator car and mounted in a hoistway in the building.
Figure 18:
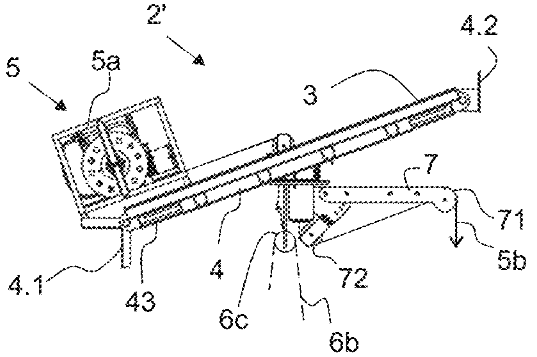
FIG. 18 shows a side view of a protection deck installed diagonally within the hoistway.
Figure 19:
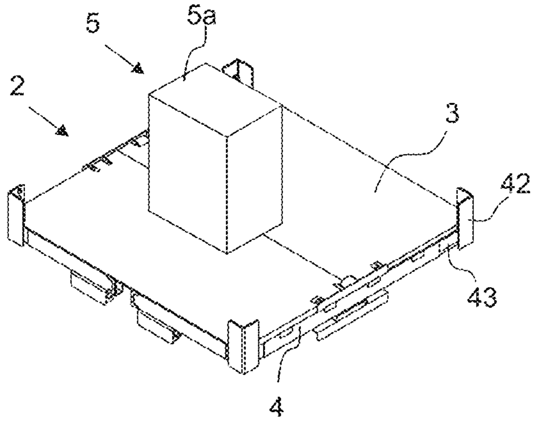
FIG. 19 shows an embodiment of a protection deck provided with a material hoist for directly supporting material without a supporting beam for a material hoist rope.

FIGS. 2, 18 and 19 show an embodiments of a protection deck 2, 2' mounted within the hoistway 1 for protecting the portion of the hoistway 1 below the protection deck 2 from any possible falling objects.

The protection deck 2' shown in FIG. 18 differs from the horizontally aligned protection deck 2 in that it can be installed diagonally within the hoistway. Thus, the protection deck 2' may be used as a top protection deck which can provide at least some of the functions of the weather deck 101. The protection deck 2' shown in FIG. 18 may be mounted inclined within the hoistway for protecting the portion of the hoistway below the protection deck 2' from falling objects and fluids during installation. The protection deck 2' can redirect or deflect falling material to minimize the impact of the falling object. The protection deck 2' comprises engagement members 4.1 and 4.2 to be engaged with opposite sides of the hoistway. In mounted state of the protection deck 2' in the hoistway 1 the first engagement member 4.1 may rest on a sill of a landing 20 and the second engagement member 4.2 may engage with the opposite wall.

The protection deck 2, 2' comprises a frame 4 mounted on walls 1*a*-1*d* of the hoistway 1. The protection deck 2, 2' comprises a cover 3 co-operating with the frame and extending substantially horizontally across the hoistway 1. The cover 3 is adapted to protect the hoistway 1 from falling objects and/or water from falling into the hoistway below it. The frame 4 is, without dismantling it, configured to be increased and/or decreased in size, individually in at least one direction in relation to the corresponding adjacent wall 1*a*, 1*b*, 1*c*, 1*d* of the hoistway 1. The frame 4 is constructed of preferably telescopic beams 43 fixed to the wall with dedicated wall fixings which can locate on every wall, but the corners are preferred to reduce amount of anchor bolts 41. Preferably the anchor bolts 41 extend into holes of the wall of the hoistway 1, which hoistway wall preferably comprises concrete. A preferred installation of the frame 4 comprises: drilling anchoring interfaces 42 (wall fixing members) to hoistway corners and/or walls; installing frame fixing elements 4' comprised by the frame 4 to the anchoring interfaces 42.

Figure 15:
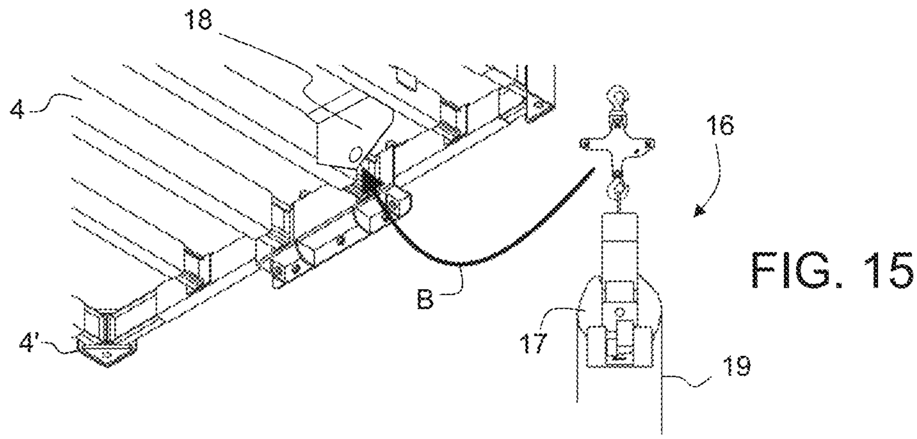
FIG. 15 shows an installation of an overspeed governor using a lifting point on the protection deck.

The protection deck 2, 2' may comprise a first lifting point 18 (see also FIG. 15) supported by the frame 4. The first lifting point 18 may be used for hanging an overspeed governor 16. The first lifting point 18 may comprise a first attaching member supported by the frame 4 for example equipped with an eye/opening or a corresponding similar means of attachment for a hook or a corresponding gripping member for hanging the overspeed governor 16.

The protection deck 2, 2' may comprise a second lifting point 22 (see also FIG. 3) supported by the frame 4. The second lifting point 22 may be used for hanging a chain hoist. The chain hoist may be used for elevator hoisting machine 30 hoisting. The second lifting point 22 may comprise a second attaching member supported by the frame 4 for example equipped with an eye/opening or a corresponding similar means of attachment for a hook or a corresponding gripping member for hanging the chain hoist.

The arrangement comprises a first hoisting apparatus 6 also called a hoist device 6. The first hoisting apparatus 6 serves for hoisting an elevator car 10 or an installation platform 80, in FIGS. 1-4, 8 and 9 supported by the protection deck 2, 2', and in FIG. 7 supported by a ceiling 1' of the hoistway 1.

The first hoisting apparatus 6 comprises a first hoisting machine 6*a* also called a man riding hoist 6*a* and a first flexible tension member 6*b* also called a hoist rope 6*b* movable with the first hoisting machine 6*a*.

The arrangement comprises a hoisting point configured to support the car 10 or the installation platform 80 via the first hoisting machine 6*a* and the first flexible tension member 6*b*.

In FIG. 2, a first embodiment of a hoisting point formed as a first diverting wheel 6*c* is rotatably mounted on the protection deck 2 for guiding and supporting the hoist rope 6*b*.

Figure 3:
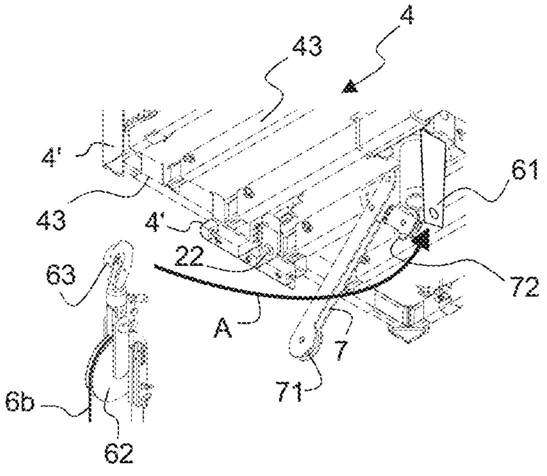
FIG. 3 shows an installation of a diverting pulley for supporting a hoist device, using a hoisting point on the protection deck.

FIG. 3 shows a preferred second embodiment of the hoisting point comprising a connecting member 61 supported by the frame 4 of the protection deck 2, 2'. A rotatable diverting pulley 62 is supported by a hook 63 or a corresponding gripping member. The hook 63 can be connected to the connecting member 61 as shown by arrow A. The connecting member 61 may be equipped with an eye/opening or a corresponding similar means of attachment for the hook 63 or said corresponding gripping member. Naturally the connection of the diverting pulley 62 and the protection deck may also be formed vice versa, the connecting member may comprise a hook-like gripping member and the attachment means supporting the diverting pulley may respectively comprise an eye or opening. The diverting pulley 62 serves for guiding and supporting the hoist rope 6*b*.

According to an embodiment the protection deck 2, 2' comprises a second hoisting apparatus 5 also called a material hoist 5 for hoisting construction material below the protection deck. The material hoist 5 is supported by the protection deck. The material hoist 5 comprises a second hoisting machine 5*a* also called a material hoisting machine 5*a* mounted on the protection deck 2, 2', preferably in particular on the frame 4 thereof, and a second flexible tension member **5*b* also called a material hoist rope 5*b* movable with the material hoisting machine 5*a*. The material hoist rope 5*b* hangs suspended by the material hoisting machine 5*a*, and the material hoist rope 5*b* is provided with a connector 5*b*1 at a lower end thereof, such as a hook for example, connected or connectable with a construction material 8, 9 to be hoisted. In the arrangement of FIG. 2, the connector 5*b*1 is connected to a construction material 8, 9 to be hoisted, which construction material 8, 9** is a guide rail section.

According to an embodiment the protection deck 2, 2' comprises a supporting beam 7 connected pivotally to the frame 4, and a second diverting wheel 71 mounted on said supporting beam 7. The material hoist rope **5*b* is guided to pass from the material hoisting machine 5*a* to the second diverting wheel 71, over it and from the second diverting wheel 71 downwards in the hoistway 1. The supporting beam 7 is more specifically connected to the frame 4 preferably pivotally around a vertical axis x as well as around a horizontal axis relative to the frame 4. Preferably the location of the second diverting wheel 71 relative to the frame is adjustable by pivoting the supporting beam 7 around said vertical axis and/or said horizontal axis. The protection deck may comprise a third diverting wheel 72 for guiding the material hoist rope 5*b* to pass from the material hoisting machine 5*a* to the second diverting wheel 71**.

FIG. 19 shows another embodiment of the protection deck 2 provided with the material hoist 5 for directly supporting material without a supporting beam 7 for the material hoist rope **5*b*. The material hoist rope 5*b* may hang directly from the material hoist 5*a*** mounted on a horizontally aligned or an inclined protection deck.

Figure 4:
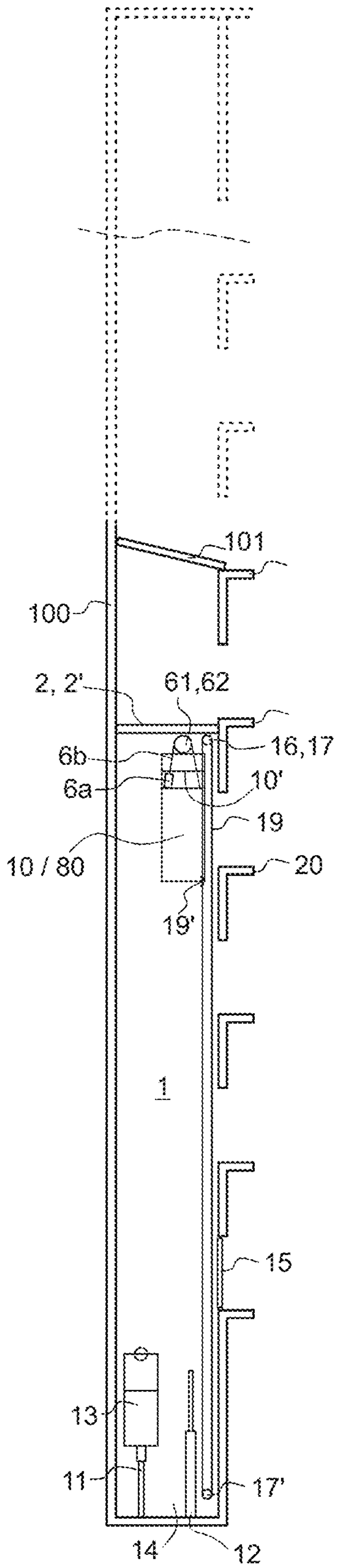
FIG. 4 shows the arrangement for installing the elevator when the working platform such as the elevator car is used as an installation platform in a bottom section of the hoistway.

The protection deck 2, 2' with auxiliary equipment may be used as movable installation tool for hoisting of large loads such as: a movable machine room of an elevator located below the protection deck or, as shown in FIGS. 1, 2 and 4, an elevator car 10 or an installation platform 80 below the protection deck, and construction material 8, 9.

The two embodiments of the hoisting point shown in FIGS. 2 and 3 enable mounting of the first hoisting machine **6*a* separate from the protection deck 2, 2'. The first hoisting machine 6*a* may be mounted on the elevator car 10 or the installation platform 80 and the first flexible tension member 6*b* passes around the diverting pulley 62 connected to the hoisting point 61**.

The material hoist 5 may be used to hoist car guide rails 8 and counterweight guide rails 9 and other heavy elevator components during the installation of the elevator.

Once the protection deck 2, 2' is installed and the hoistway 1 is sealed, the elevator installation can start for the bottom section of the hoistway 1 below the protection deck 2, 2'.

In short, in the bottom section of the hoistway 1 below the protection deck 2, 2', car guide rails 8, counterweight guide rails 9, a counterweight buffer assembly 11, a car buffer assembly 12, a counterweight (CWT) 13 and a working platform are installed in a pit 14. The working platform 10, 80 is then used as the installation platform for the bottom section of the hoistway (FIG. 4). The working platform comprises the car 10 or the installation platform 80.

According to an embodiment by the car 10 is meant at least parts of the car, such as a car sling, which may be guided on the car guide rails 8. According to an embodiment the working platform comprises the car with the car sling which is complemented by a platform such as a working deck for the installer. According to an embodiment the working platform comprises the car with the sling but does not have walls and a roof. According to an embodiment the car is equipped also with walls and a roof. According to an embodiment the car is a final car. According to an embodiment, the working platform comprises the car 10 or at least parts of the car to be guided on the car guide rails. According to an embodiment, the working platform comprises the installation platform 80.

According to an embodiment the car 10 is used as the working platform in the bottom section. The car 10 is moved with the help of the hoist device such as the man riding hoist **6*a*, utilizing the hoisting point 6*c*, 61 of the protection deck. The landing doors 15 and other elevator hoistway components are installed in the bottom section of the hoistway 1. The elevator installation below the protection deck is then completed for construction time use. An elevator hoisting machine 30 and elevator suspension ropes 31 are installed and a temporary headroom 1.1 electrification is finalized in the uppermost part of the bottom section of the hoistway 1 below the protection deck. Thereafter the elevator is inspected and handed over for construction time use to serve the bottom section of the hoistway 1 (FIG. 6**).

According to an embodiment the installation platform 80 is used as the working platform in the bottom section. The installation platform 80 is moved with the help of the hoist device such as the man riding hoist **6*a*, utilizing the hoisting point 6*c*, 61 of the protection deck 2. The landing doors 15 and other elevator hoistway components are installed in the bottom section of the hoistway 1. The elevator installation below the protection deck is then completed for construction time use. The installation platform is removed from the hoistway 1. The car 10 is guided on the car guide rails 8. An elevator hoisting machine 30 and elevator suspension ropes 31 are installed and a temporary headroom 1.1 electrification is finalized in the uppermost part of the bottom section of the hoistway 1 below the protection deck. Thereafter the elevator is inspected and handed over for construction time use to serve the bottom section of the hoistway 1 (FIG. 6**).

While the elevator is installed at the bottom section of the building 100, the building construction continues normally above it.

Figure 6:
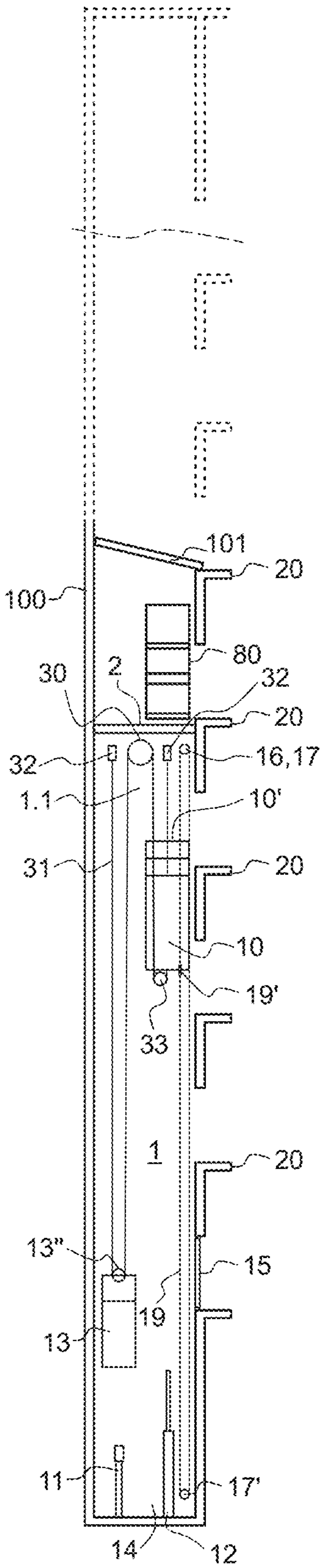
FIG. 6 shows the CTU elevator with an installation platform installed on top of the protection deck.

FIG. 6 shows the CTU elevator in the bottom section and an installation platform 80 moved on top of the protection deck 2 as a preparation for a next section elevator installation.

The installation platform 80 supported by a hoisting point 61, 62 provided by the protection deck (FIG. 8) or the ceiling 1' (FIG. 7) of the hoistway 1 may be used in the next at least one installation above the bottom section. The elevator installation is paused until the hoistway for a next section is ready.

The next section may be a top section in case of a two-zone elevator installation.

Figure 7:
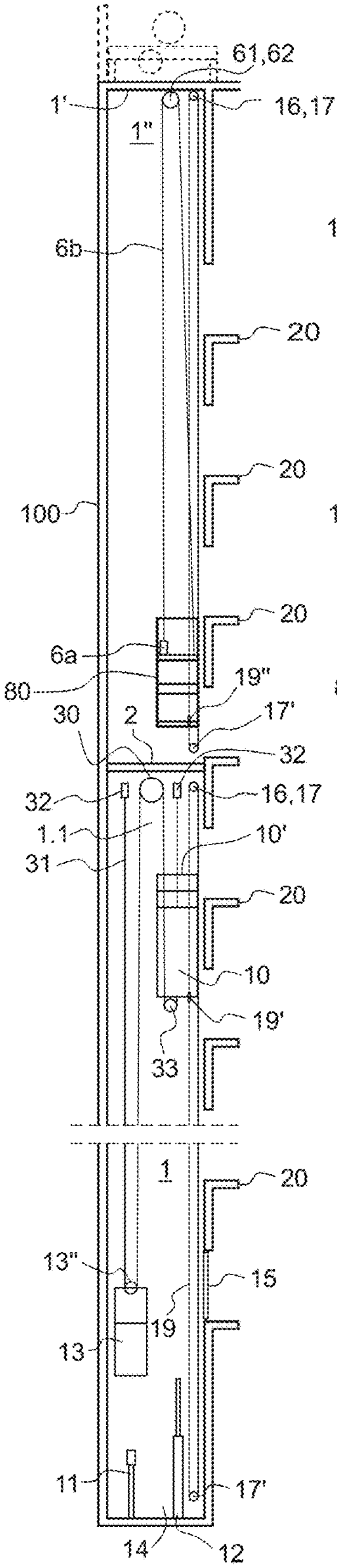
FIG. 7 shows a top section installation using the installation platform while the below section/s is/are in construction time use.

When the next section above the bottom section is a top section as shown in FIG. 7, the hoist device such as the man riding hoist **6*a* is connected by a hoisting point 61, 62 to a ceiling 1' of the hoistway 1 for supporting the installation platform 80**.

Figure 8:
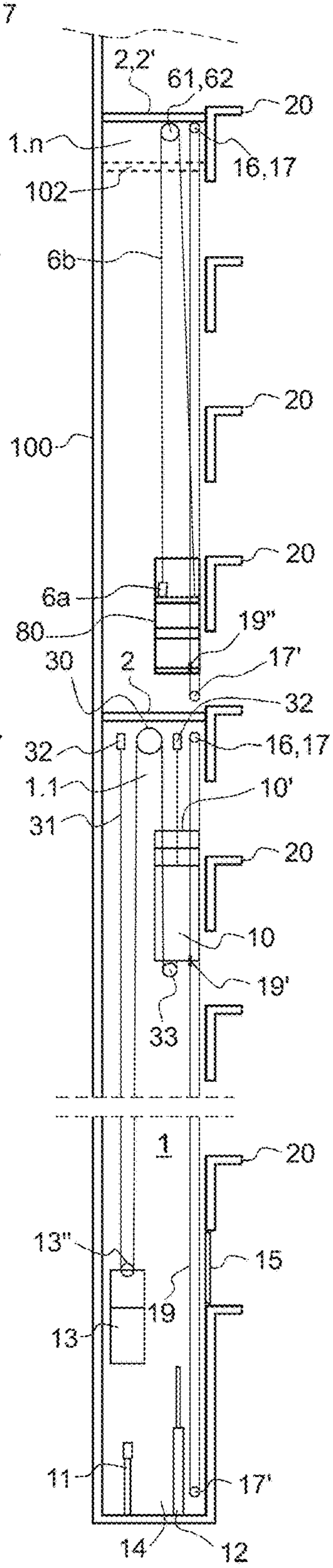
FIG. 8 shows an intermediate section installation using the installation platform in case of a multi-zone elevator installation.

When the next section above the bottom section is an intermediate section in case the elevator is installed in more than two sections as shown in FIG. 8, the hoist device such as the man riding hoist **6*a* is supported utilizing the hoisting point 6*c*, 61 of a second protection deck 2, 2'. The elevator installation with guide rails, landing doors, elevator hoistway electrification etc. continues for the next section from the installation platform 80. Embodiments of an installation platform are shown in FIGS. 12 and 13**.

For extending the travel to the next intermediate section, the elevator is taken out of CTU in the below section and the below section top components are moved to the temporary headroom 1.*n* of the now finalized intermediate section. The suspension ropes 31 are extended or replaced with longer ones. The installation platform 80 and the below protection deck 2 are taken out of the hoistway 1. The elevator is inspected and handed over for construction time use, while the elevator installation above continues in case of a multi-zone elevator installation. The intermediate section installation is repeated as many times as needed. The elevator installation is first paused until the above hoistway and the machine room (if applicable) is ready.

Figure 10:
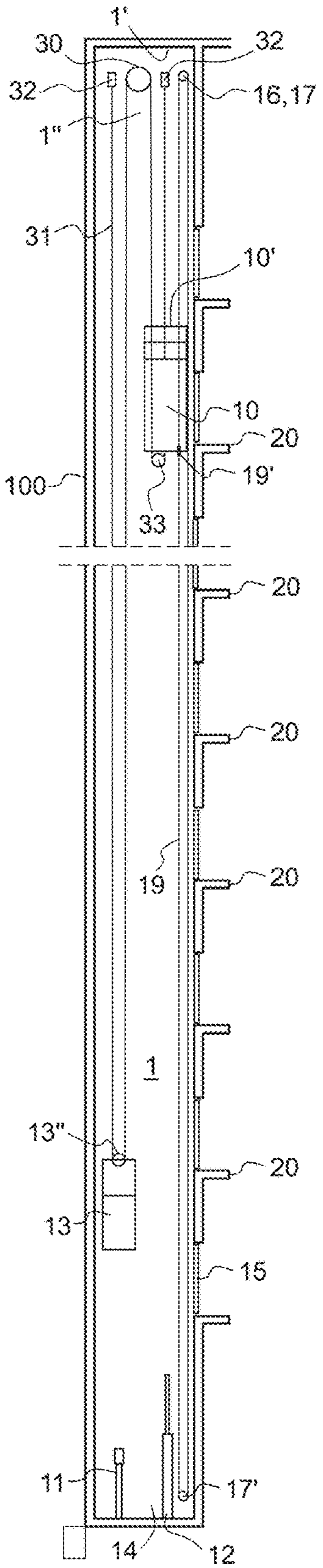
FIG. 10 shows a machine-room-less elevator ready for construction time use for the full height of the building.
Figure 11:
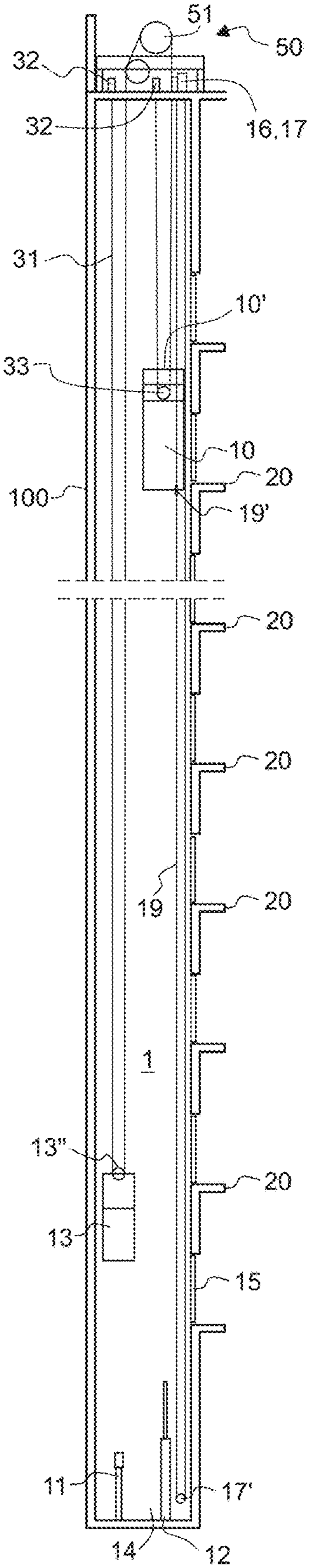
FIG. 11 shows a machine room elevator ready for construction time use for the full height of the building.

In short, for the top section installation the installation platform 80 is supported from the ceiling 1' as shown in FIG. 7. The elevator installation with guide rails, landing doors, elevator hoistway electrification etc. continues for the top section from the installation platform 80. For extending the travel up to the top section, the elevator in the below section is taken out of CTU and the below section top components are moved to the final headroom 1" of the installed top section (FIG. 10) or final elevator components are installed to a machine room 50 above the hoistway 1 (FIG. 11). A final electrification is installed to the headroom 1" or in case of the machine room elevator to the machine room 50. The suspension ropes 31 are extended or replaced with longer ones. The installation platform 80 and respective below protection deck are taken out of the hoistway 1. The elevator is inspected and handed over for construction time use for the full height of the building as shown in FIGS. 10 and 11. The elevator runs in construction time use for whole travel until the final handover. The car 10 may transport people and/or goods between the landings 20 in the building 100.

Figure 12:
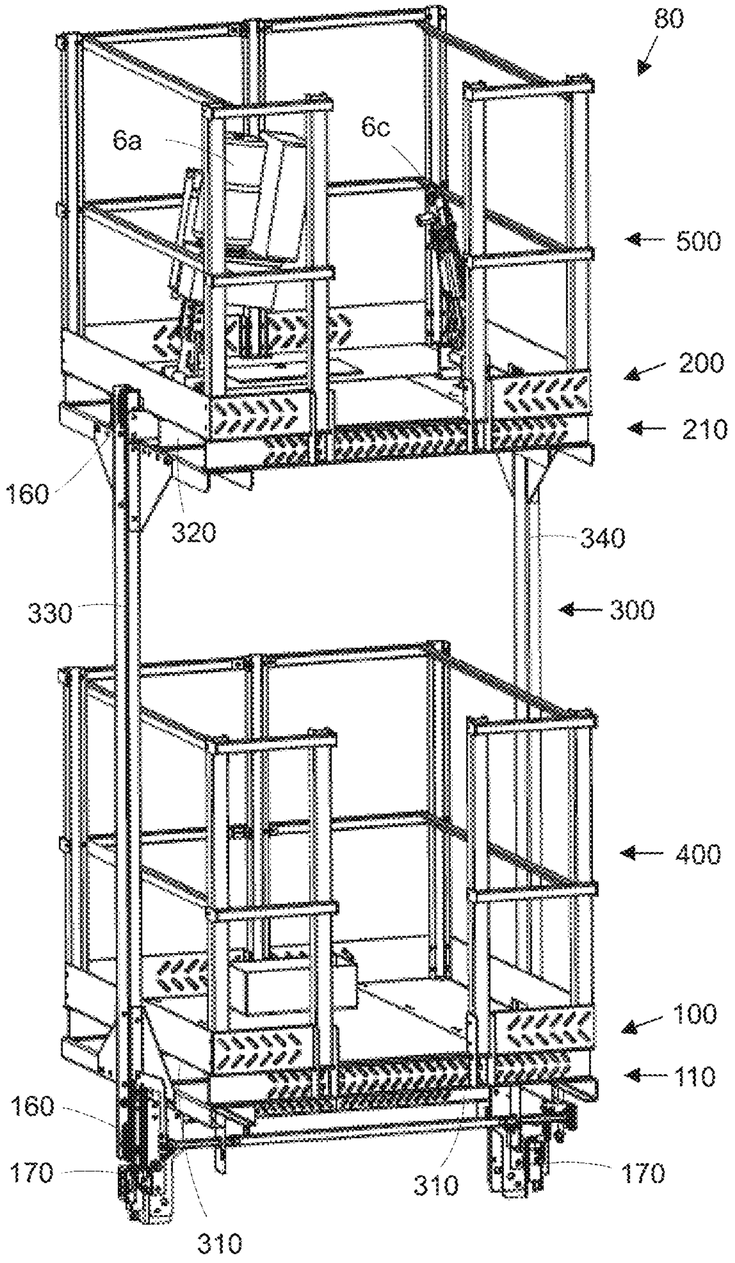
FIG. 12 shows an isometric view of the installation platform.
Figure 13:
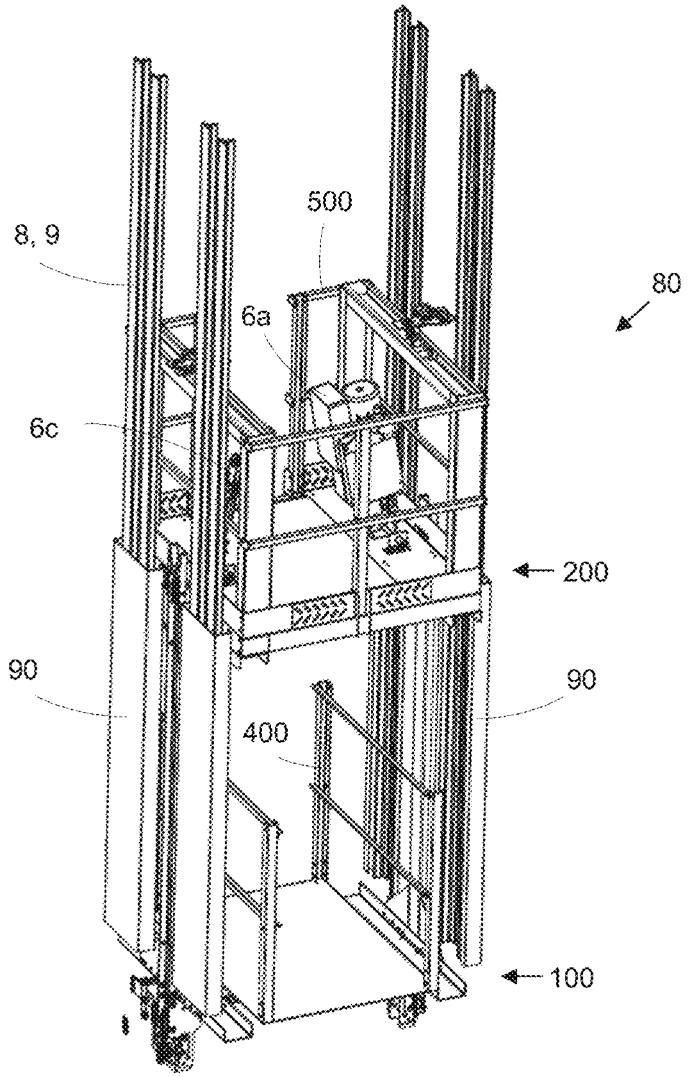
FIG. 13 shows an isometric view of the installation platform provided with adjustable guide rail magazines.

The installation platform 80 of FIG. 12 comprises a first deck 100, a second deck 200, and a support frame 300 supporting the decks 100, 200. The second deck 200 is positioned above the first deck 100. Each deck 100, 200 may comprise a bottom 110, 210 and handrail constructions 400, 500. The first deck 100 may form a lower deck and the second deck 200 may form an upper deck. The installation of the guide rails 8, 9 and other equipment of the elevator may be done manually and/or automatically from both decks 100, 200. The installation platform 80 may be lifted with the man riding hoist 6*a* which may be supported on the upper deck 200. The hoist rope 6*b* may pass over the diverting wheel 6*c* or the diverting pulley 62 rotatably mounted in a hoisting point on the protection deck 2 for guiding and supporting the hoist rope 6*b*. The other end of the hoist rope 6*b* may be supported on a fastener 6*c* being supported on the upper deck 200.

The support frame 300 may comprise horizontal support beams 310, 320 supporting a respective deck 100, 200 and vertical support beams 330, 340 extending between the horizontal support beams 310, 320. A vertical support beam 330, 340 may extend vertically between respective outer ends of the horizontal support beams 310, 320. Support beams in the bottom 110, 210 of the decks 100, 200 may be formed of separate beams being arranged to form a telescopic structure which is horizontally stretchable and contractable in a width direction or in a depth direction or in both width and depth directions. The installation platform 80 may thus be adapted to different hoistway sizes and shapes.

The installation platform 80 may further comprise guide means 160 for guiding the installation platform movably on the car guide rails 8. The guide means 160 may be supported on the support frame 300 e.g. on the vertical support beams 330, 340 of the support frame 300. The installation platform may further comprise gripping means 170 for securing the installation platform to the guide rails 8 and/or on guide rail fixing means. The gripping means 170 may be formed of a safety gear eliminating unintentional falling of the installation platform. The gripping means 170 may be positioned on opposite vertical sides of the installation platform.

Figure 14:
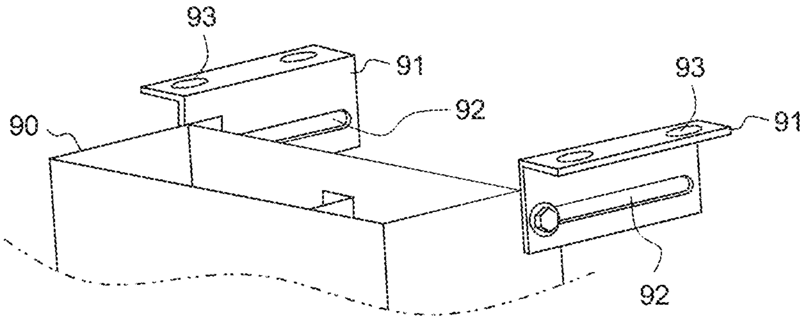
FIG. 14 shows an upper end of the adjustable guide rail magazine.

FIG. 13 shows the installation platform 80 provided further with guide rail magazines 90, which allow the transport of different sizes of guide rails 8, 9 on the installation platform 80. In addition, the guide rail magazines 90 may be retracted into the car projection of the elevator. An upper end of the guide rail magazine 90 is shown in FIG. 14. The guide rail magazines 90 may be attached to the decks 100, 200 with brackets 91 comprising an elongated hole 92 or with a corresponding fixing means providing a movement guide which is configured to enable adjusting the magazine 90 between a retracted position and a pulled-out position in relation to the installation platform 80. Fixing holes 93 in the brackets 91 enable fixing of the brackets 91 for example to the underside of a respective deck 100, 200 of the installation platform 80. Preferably, the guide rail magazine 90 is configured to be adjustable between a retracted position and a pulled-out position in relation to the decks 100, 200 the installation platform 80. Preferably, the guide rail magazines 90 are configured to be adjustable between a retracted position and a pulled-out position in relation to the first deck 100 and the second deck 200 of the installation platform 80. A lower end of the guide rail magazine 90 preferably is provided with similar fixing means as the upper end enabling adjusting the magazine 90 between a retracted position and a pulled-out position in relation to the installation platform 80.

The embodiment of FIG. 13 comprises four guide rail magazines 90, but there could be any number of guide rail magazines supported on the installation platform. The at least one guide rail magazine 90 may be attached to the first deck 100 and to the second deck 200 at sides of the guide means 160. The guide rail magazines may also support the installation platform 80 in the vertical direction i.e. they will increase the rigidity of the installation platform.

The guide rail magazine 90 is sized to fit between the upper and lower decks 100, 200. When the guide rail magazines 90 are fully pulled out, they can accommodate the largest possible guide rails 8, 9 and can be retracted to accommodate the number of guide rails that need to be carried. When fully retracted, the magazines may not accommodate guide rails, but the magazines may be completely within the projection of the elevator car, allowing the installation platform to pass elevator components.

The installation of the elevator is described in more detail hereinafter. After the protection deck 2 is installed in the bottom section of the hoistway 1 as shown in FIG. 1, the overspeed governor 16 (OSG) and the man riding hoist 6*a* may be installed to the protection deck 2, preferably working from the working deck 102. The overspeed governor 16 comprising an OSG upper pulley 17 may be installed preferably to the protection deck 2 via the first lifting point 18 attached to the protection deck 2 as shown by arrow B in FIG. 15. The chain hoist may be attached via the second lifting point 22 to the protection deck for hoisting the elevator hoisting machine 30. An OSG rope 19 may be passed over the OSG upper pulley 17. The man riding hoist 6*a* with the hoist rope 6*b* may be installed to the hoisting point 61 in the protection deck 2 (FIG. 3). Preferably the OSG rope 19 ends and the hoist rope 6*b* ends may be temporarily routed to a landing 20 of the building 100.

The material hoist 5 may be installed on top of the protection deck 2. The working deck 102 may be removed and the OSG rope 19 ends and the hoist rope 6*b* ends may be lowered to the pit 14. Also guide rails 8, 9 may be placed into the pit, preferably using the material hoist 5.

A first round of guide rails 8, 9 may be installed and aligned in the pit area by suitable plumbing apparatus, preferably guide rail plumbing tools are installed on the protection deck 2. The CWT and car buffers 11, 12 are installed in the pit. An OSG lower pulley 17' with an OSG tension weight may be installed. The CWT 13 with a frame 13' filled partly, preferably 40%, with CWT fillers 21 and equipped with at least one CWT pulley 13" may be installed to be guided by the CWT guide rails 9.

In case the car 10 or at least parts of the car is used as the working platform in the bottom section, the car 10 or at least parts of the car is installed inside the hoistway 1 to be guided by the car guide rails 8. The car 10 may be equipped with a car sling having a top beam and a bottom beam. The OSG rope 19 may be fixed to the car by OSG rope terminals 19' and guided around the upper and lower OSG pulleys. A balustrade 10' may be installed on the car. A safety gear may be connected to the car sling and the OSG rope 19. An automatic safety gear trigger (ASGT) may be attached to the car 10. The ASGT engages the safety gear automatically in the event of hoist rope failure or manually when it is necessary to secure the car. The hoist device such as the man riding hoist 6*a* is attached to the car 10 for moving the car during installation of the bottom section of the hoistway 1.

Moving the car 10 with the hoist device such as the man riding hoist 6*a* and using the car 10 as the installation platform, the car and counterweight guide rails are installed and aligned preferably up to the protection deck according to plumb lines formed by for example plumb wires attached to the protection deck 2 or using laser tools for plumbing. Preferably the car 10 is used for lifting guide rails. Guide rails may be lifted using the material hoist 5. Guide rails may be fitted using a guide rail lifting clamp to lift each rail. The guide rails may be installed through the protection deck 2 to allow a later dismantling of the protection deck 2 from the car 10 roof. Suitable openings for the guide rails may be cut to the protection deck cover 3.

Figure 17:
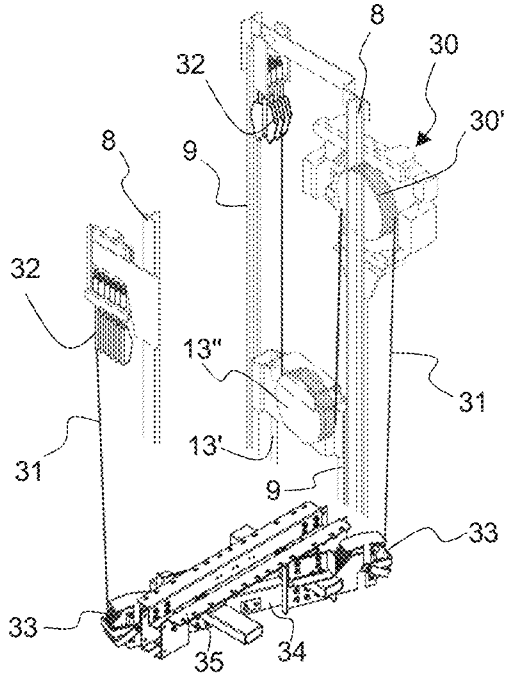
FIG. 17 shows preferred details of a passage of a suspension roping for the elevator car and a counterweight.

In some cases, a skewed pulley beam 34 shown in FIG. 17 is installed to the car sling bottom beam 35. A skewed pulley beam may also be installed to the car sling top beam.

In case the installation platform 80 is used as the working platform in the bottom section, the installation platform 80 is installed inside the hoistway 1 to be guided by the car guide rails 8. The OSG rope 19 may be fixed to the installation platform 80 by OSG rope terminals 19' and guided around the upper and lower OSG pulleys. A balustrade 10' may be installed on the installation platform 80. A safety gear may be connected to the installation platform 80 and the OSG rope 19. An automatic safety gear trigger (ASGT) may be attached to the installation platform 80. The ASGT engages the safety gear automatically in the event of hoist rope failure. The hoist device such as the man riding hoist 6*a* is attached to the installation platform 80 for moving the installation platform during installation of the bottom section of the hoistway 1.

Moving the installation platform 80 with the hoist device such as the man riding hoist 6*a* and using the installation platform 80 as the installation platform, the car and counterweight guide rails are installed and aligned preferably up to the protection deck according to plumb lines formed by for example plumb wires attached to the protection deck 2 or using laser tools for plumbing. Preferably the installation platform 80 is used for lifting guide rails. Guide rails may be lifted using the material hoist 5. Guide rails may be fitted using a guide rail lifting clamp to lift each rail. The guide rails may be installed through the protection deck 2 to allow a later dismantling of the protection deck 2 from the car 10 roof. Suitable openings for the guide rails may be cut to the protection deck cover 3.

Using the car 10 or the installation platform 80 as the installation platform, the landing doors 15 may be installed, preferably from third floor upwards, up to topmost floor of the bottom section, and preferably simultaneously the door-to-door electrification (if any) is installed. The bottom landing door is installed. An elevator hoistway and pit electrification are installed below the protection deck 2. Also landing call stations to each floor 20 of the bottom section are installed.

After using the installation platform 80 as the installation platform for the bottom section, the car 10 is installed inside the hoistway 1 to be guided by the car guide rails 8.

Preparations are then made to support the car 10 and the counterweight 13 by the suspension ropes 31 suspended by rope suspenders 32 and the elevator hoisting machine 30 so that the first elevator can serve as construction time use elevator for the bottom section of the building 100.

Preferably the elevator hoisting machine 30 is hoisted close to the hoistway 1 wall before installing the last car guide rail 8 using a chain hoist hanging from the second lifting point 22 supported by the protection deck 2. The chain hoist may be manually operated.

The elevator hoisting machine 30 is installed to the car guide rail 8 to be supported by the car guide rail 8. The elevator hoisting machine 30 can be a construction time elevator hoisting machine or a final elevator hoisting machine to be finally installed in the headroom 1" in the top section of the hoistway 1 after the elevator jump or a plurality of jumps.

Figure 16:
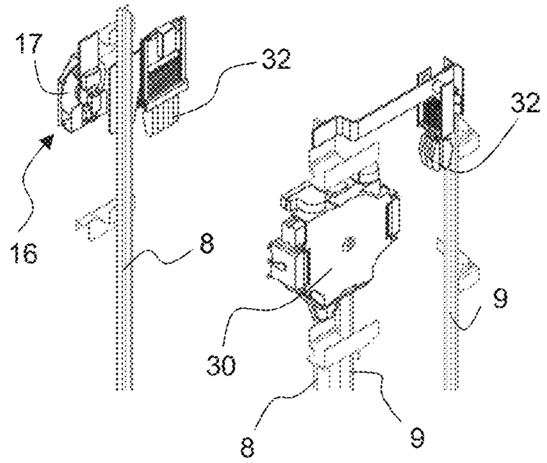
FIG. 16 shows mechanical components of a machine-room-less elevator installed at top of the hoistway.

The rest of the mechanical components is installed below the protection deck as shown in FIG. 16, such as the guide rails 8, 9, and the rope suspenders 32 supported by the guide rails. On each of the rope suspenders 32, an end of a suspension roping 31 can be fixed.

The car 10 may be parked to the temporary headroom 1.1 of the bottom section near the topmost landing of the bottom section and secured in place as shown in FIG. 4, by activating the safety gear and using a parking chain.

Working from the car 10 roof, the overspeed governor 16 may be moved from the protection deck 2 to be supported by the car guide rail 8 opposite the car guide rail supporting the elevator hoisting machine 30 and the OSG rope 19 tightness may be adjusted.

Using the car 10 as the installation platform, the landing doors 15 may be installed, preferably from third floor upwards, up to topmost floor of the bottom section, and preferably simultaneously the door-to-door electrification (if any) may be installed. The bottom landing door may be installed. An elevator hoistway and pit electrification may be installed below the protection deck 2. Also landing call stations to each floor 20 of the bottom section may be installed. The electrification with associated final components such as sensors and positioning members, signalization components, lightning, a car door with sill and the landing door to the second landing may be installed.

The traveling cable may be installed to the first hoistway 1 wall for example using the material hoist 5 and respectively to the car 10 and connected to the electrification.

The suspension roping 31 is arranged to suspend the car 10 and the counterweight 13 for bottom section of the elevator. The suspension ropes 31 are preferably wound on cable drums (not shown in Figures) from bottom section of the elevator so that suitable length of the suspension ropes 31 may be unwound from each cable drum during the installation of the construction elevator. The weight of the elevator hoisting machine 30, as well as the load exerted by the suspension roping 31 passing around a drive wheel of the elevator hoisting machine 30, is carried by the guide rail section 8, 9, and transmittable by the guide rail section to the guide rail sections below it at least partly so that the complete weight of the of the elevator hoisting machine 30, as well as the load exerted by the suspension roping 31 passing around said drive wheel. The load exerted by the suspension roping 31 passing around said drive wheel is formed partially by weight of the suspension roping 31 and partially by the elevator units, such as the car 10 and the counterweight 13 suspended by the suspension roping 31. The suspension roping passage shown in FIG. 17 may be used for the roping 31 installed for the elevator in the bottom section of the building 100.

FIG. 17 shows preferred details of a passage of a suspension roping for the elevator car and a counterweight in case of the machine-room-less elevator when the elevator hoisting machine 30 is supported by the car guide rail 8.

The suspension ropes 31 pass from the first rope suspender 32 to at least one car pulley, here downwards to a first car pulley 33 and further horizontally to a second car pulley 33. The car pulleys 33 may be positioned at the outer ends of the skewed pulley beam 34 extending across the sling bottom beam 35 of the car 10. The skewed pulley beam 34 may extend in the horizontal direction. The car 10 may thus be supported on the skewed pulley beam 34 and thereby on the suspension ropes 31 passing over the car pulleys 33. The suspension ropes 31 pass after the second car pulley 33 upwards to a drive wheel 30' of the elevator hoisting machine 30 and further downwards to the at least one CWT pulley 13". The suspension ropes 31 pass after the at least one CWT pulley 13" finally upwards to the second rope suspender 32. The counterweight 13 is hanging from the at least one counterweight pulley 13". The at least one counterweight pulley may be skewed.

Temporary compensation chains may be installed at the bottom section of the elevator.

The hoist device such as the man riding hoist 6*a* is detached from the car 10 and taken out of the hoistway 1. The automatic safety gear trigger (ASGT) may be detached from the car 10. The material hoist 5 with the material hoist rope 5*b* is removed from the protection deck and may be used on top of the next section, when the building has reached that height.

Figure 5:
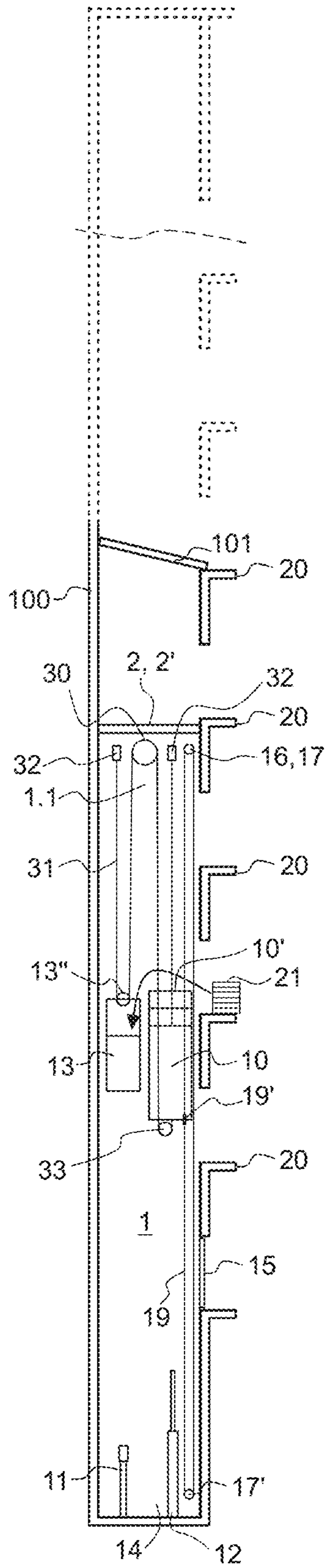
FIG. 5 shows the arrangement for installing the elevator when the elevator car is prepared for construction time use in the bottom section of the hoistway.

For a preferred CWT filler 21 installing, the car 10 is positioned about to the middle of the bottom section. Working from the car 10 roof, the rest of the CWT fillers 21 may be installed in the CWT frame 13' as shown in FIG. 5.

After bottom section mechanics and electronics installation and safety inspection, the elevator in the bottom section of the hoistway 1 is ready for commissioning for the construction time use.

FIG. 6 shows the CTU elevator in the bottom section and the installation platform 80 moved on top of the protection deck 2.

FIGS. 7 and 8 show the installation platform 80 supported by a hoisting point 61, 62 provided by the second protection deck or the ceiling 1' of the hoistway 1. The weather deck 101 may be removed from the hoistway or hoisted above the next section.

For the intermediate section installation, preparations are made to support the installation platform 80 from the protection deck so that the installation platform 80 can be used for installing the intermediate section as shown in FIG. 8. The second protection deck is installed to top of the intermediate section of the hoistway 1, preferably working from a temporary working deck 102 as shown in FIG. 8. During the elevator installation works at the intermediate section of the building 100, the building construction continues normally above it.

The diverting pulley 62 and the hoist rope 6*b* are installed to hang from the hoisting point 61 in the protection deck 2'. An installation platform OSG 16 comprising an OSG upper pulley 17 may be installed to the protection deck 2' via the first lifting point 18. The chain hoist may be attached via the second lifting point 22. An installation platform OSG rope 19 may be passed over the OSG upper pulley 17. The OSG rope 19 ends and the hoist rope 6*b* ends may be temporarily routed to a landing 20 of the building 100.

The intermediate section plumbing may be performed by installing plumb lines formed by for example plumb wires attached in a plumbing jig installed on the upper protection deck or on a topmost landing of that intermediate section. The plumb lines are aligned according to the guide rails in the below section.

Guide rails 8, 9 of the section may be placed onto the protection deck and one to two rounds of guide rails may be installed and aligned working from the protection deck.

The installation platform 80 may be installed at that stage on the protection deck at the bottom of the intermediate section.

The man riding hoist 6*a* and an automatic safety gear trigger (ASGT) may be attached to the installation platform 80 during platform 80 installation. The overspeed governor tension weight may be installed just above the protection deck 2' and the OSG rope 19 may be routed around the tension weight pulley 17'. The OSG rope 19 may be connected to a synchronisation lever 19" of the installation platform.

Moving the installation platform 80 with the man riding hoist 6*a*, the car and counterweight guide rails may be installed and aligned up to the temporary headroom 1.*n* below the second protection deck according to plumb lines formed by for example plumb wires attached to the second protection deck or using laser tools for plumbing. The installation platform 80 provided with at least one guide rail magazine 90 may be used for lifting guide rails. Guide rails may be lifted using the material hoist 5 installed on top of the protection deck. Guide rails may be fitted using a guide rail lifting clamp to lift each rail. The guide rails may be installed through the second protection deck. Suitable openings for the guide rails may be cut to the protection deck cover 3 of the above protection deck.

The electrification with associated sensors and positioning members, signalization components, lightning and intermediate section landing doors 15 may be installed to the hoistway.

The installation platform 80 may be driven to bottom of the intermediate section, onto the protection deck at the bottom of the intermediate section. The man riding hoist 6*a* may be detached from the installation platform 80. The installation platform 80 may be removed from the intermediate section hoistway. After completing the intermediate section installation described above, the elevator in the below section is taken temporarily out of CTU for extending the elevator travel.

The temporary compensation chains from the CWT 13 and from the car 10 may be removed at the below section of the elevator. The automatic safety gear trigger (ASGT) wire may be installed to the car 10.

Working from the car 10 roof, the first protection deck may be removed for example using the material hoist 5 of the upper protection deck. After removing the auxiliary equipment from the below protection deck, that protection deck can be removed from the hoistway preferably by dismantling telescopic beams 43 thereof, removing the anchoring interfaces 42 and cutting the anchor bolts 41.

The hoist device such as the man riding hoist 6*a* may be attached to the car 10, preferably to a car sling top beam, allowing the car 10 to be used as installation platform. An automatic safety gear trigger (ASGT) may be attached to the car 10.

The car 10 may be parked to the temporary headroom of the below section near the topmost landing of the below section. The car 10 may be secured in place, by activating the safety gear and using the parking chain.

The lower section suspension ropes 31 may be removed and reeled onto rope reels.

The OSG rope 19 may be extended by lowering the installation platform OSG rope to the pit, attaching an OSG extension rope to the installation platform OSG rope, and removing the car OSG rope.

Using the car 10 as installation platform and working from the car 10 roof, the below section hoistway 1 top components such as the elevator hoisting machine 30, the rope suspenders 32 and the CTU electrification may be removed. The traveling cable may be moved up from the below section to the next section and extended, if needed.

Figure 9:
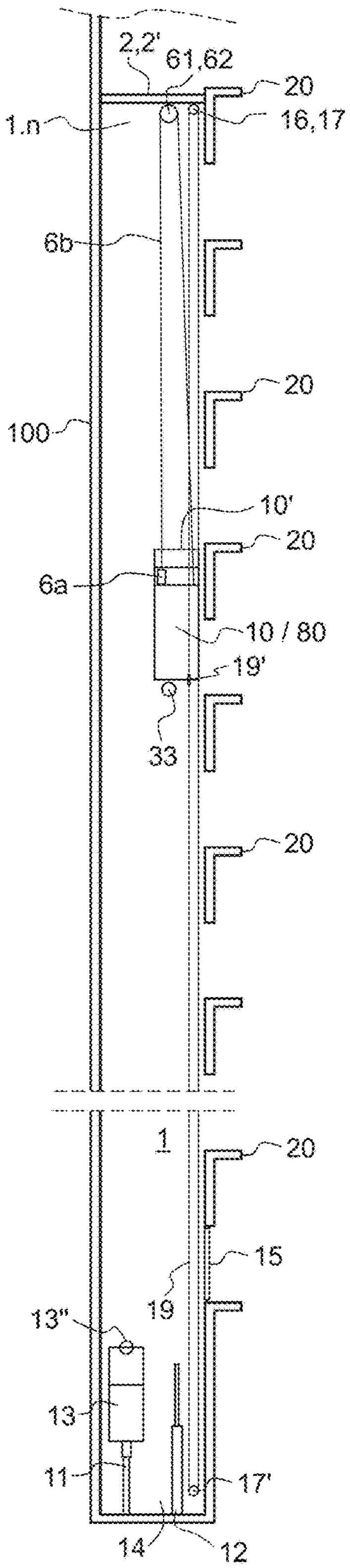
FIG. 9 shows the intermediate section installation during extension of the elevator travel.

FIGS. 8 and 9 show the intermediate section installation.

The rest of the CTU components may be installed in the upper temporary headroom 1.*n* as shown in FIGS. 16 and 17, such as the elevator hoisting machine 30 and the rope suspenders 32 supported by the guide rails, and hoistway 1 top electrification and other components. The installation platform overspeed governor may be replaced with the elevator car OSG 16, 17 and moved from the upper second protection deck to be supported by the guide rail 8.

The suspension ropes 31 may be installed as shown for example in FIG. 17. A set of ropes at correct length is required for each jump.

The hoist device such as the man riding hoist 6*a* may be detached from the car 10 and taken out of the hoistway 1. The automatic safety gear trigger (ASGT) may be detached from the car 10. The material hoist 5 with the material hoist rope 5*b* may be removed from the upper protection deck and may be used on top of the next section, when the building has reached that height.

Temporary compensation chains may be installed for the extended travel of the elevator by extending the below section compensation chain or using a new one.

After the intermediate section mechanics and electronics installation and safety inspection, the elevator from the bottom up to the intermediate section of the hoistway 1 is ready for commissioning for the construction time use.

The installation of next intermediate section installations may be performed using similar intermediate section method as described above.

Transporting the tools for installation to the topmost served landing such as the installation platform 80, the protection deck 2 and the plumbing tools may be performed using the construction time use elevator.

FIG. 7 shows the top section installation using the installation platform 80 while the below section/s is/are in construction time use.

FIGS. 7, 10 and 11 show the continued top installation of the elevator for full height of travel when the building 100 has reached the full height, the roof 1' of the hoistway 1 is closed, and the elevator is in construction time use in the below sections.

For the top section installation, preparations are made to support the installation platform 80 from the ceiling 1' of the hoistway 1 so that the installation platform 80 can be used for installing the top section as shown in FIG. 7.

The hoisting point 61 with diverting pulley 62 and hoist rope 6*b* are installed to hang temporarily from the hoistway ceiling 1' for example via an eyebolt bolted to the ceiling. An installation platform OSG 16 comprising an OSG upper pulley 17 may be installed to the ceiling 1' for example via an eyebolt bolted to the ceiling in case of a machine-room-less elevator. In case of the machine room elevator the OSG 16 comprising an OSG upper pulley 17 may be installed in the machine room 50 as shown in FIG. 11. A material hoist may be attached to the ceiling 1' for lifting elevator components such as the elevator hoisting machine 30.

An OSG rope 19 may be passed over the OSG upper pulley 17. The OSG rope 19 ends and the hoist rope 6*b* ends may be temporarily routed to a landing 20 of the building 100. The OSG rope may be long enough for the final elevator travel.

After all builders' decks, in other words, the weather deck 101 and temporary working decks 102 are removed from the hoistway 1, the top section plumbing may be performed by installing plumb lines formed by for example plumb wires attached in a plumbing jig to a topmost landing 20 in case of the machine-room-less elevator or using laser tools for plumbing. The plumb lines are aligned according to the guide rails in the below section. In case of the machine room elevator a plumbing template may be set on the machine room 50 floor.

Guide rails 8, 9 of the top section may be placed onto the protection deck 2, 2' at the bottom of the top section and one to two rounds of guide rails 8, 9 may be installed and aligned working from the protection deck 2, 2' at the bottom of the top section.

The installation platform 80 may be installed at that stage on the protection deck 2, 2' at the bottom of the top section.

The elevator may be taken out of CTU. The hoist device such as the man riding hoist 6*a* and the automatic safety gear trigger (ASGT) may be attached to the installation platform 80 during platform 80 installation. The overspeed governor tension weight may be installed just above the protection deck 2, 2' at the bottom of the top section and the OSG rope 19 may be routed around the tension weight pulley 17'. The OSG rope 19 may be connected to a synchronisation lever 19" of the installation platform. An extension OSG rope may be used to enable rope length adjusting. Rest of the OSG rope may be stored onto the installation platform 80.

Moving the installation platform 80 with the hoist device such as the man riding hoist 6*a*, the car guide rails 8 and counterweight guide 9 rails may be installed and aligned up to the final headroom 1" below the ceiling 1'. In case of the machine-room-less elevator, the plumbing equipment may be removed during the topmost guide rail installation.

The installation platform 80 provided with at least one guide rail magazine 90 may be used for lifting guide rails. Guide rails may be lifted using the material hoist installed to the ceiling 1'. Guide rails may be fitted using a guide rail lifting clamp to lift each rail.

Working from the installation platform 80 (in case of the machine-room-less elevator) the overspeed governor 16 may be moved from the ceiling 1' to be supported by the car guide rail 8 opposite the car guide rail supporting the elevator hoisting machine 30.

Rest of the landing doors 15 may be installed and the hoistway electrification with for example signalization components and hoistway lightning etc. may be installed for the top section from the installation platform 80.

In case of the machine room elevator, machine room 50 components may be installed, for example the elevator hoisting machine 51, the overspeed governor 16, 17, a controller and the machine room electrification.

The installation platform may be driven to bottom of the top section, onto the protection deck 2, 2' at the bottom of the top section. The hoist device such as the man riding hoist **6*a* may be detached from the installation platform 80. The installation platform 80 may be removed from the top section hoistway. After completing the above-described top section installation, the elevator in the below section (bottom or intermediate section) is taken temporarily out of CTU for extending the elevator travel for the full height of the hoistway 1**.

The temporary compensation chains from the CWT 13 and from the car 10 may be removed at the below section of the elevator. The automatic safety gear trigger (ASGT) wire may be installed to the car 10.

Working from the car 10 roof, the below protection deck 2, 2' may be removed for example using the material hoist attached to the ceiling 1'. After removing the auxiliary equipment from the below protection deck 2, 2', that protection deck can be removed from the hoistway preferably by dismantling telescopic beams 43 thereof, removing the anchoring interfaces 42 and cutting the anchor bolts 41.

The hoist device such as the man riding hoist **6*a* may be attached to the car 10, preferably to a car sling top beam, allowing the car 10 to be used as installation platform. An automatic safety gear trigger (ASGT) may be attached to the car 10**.

The car 10 may be parked to the temporary headroom of the below section near the topmost landing of the below section. The car 10 may be secured in place, by activating the safety gear and using the parking chain.

The lower section suspension ropes 31 may be removed and reeled onto rope reels.

The OSG rope 19 may be extended by lowering the installation platform OSG rope to the pit, attaching an OSG extension rope to the installation platform OSG rope, and removing the car OSG rope.

Using the car 10 as installation platform and working from the car 10 roof, the below section hoistway 1 top components such as the elevator hoisting machine 30, the rope suspenders 32 and the CTU electrification may be removed from the below section temporary headroom **1.*n***. The traveling cable may be moved up from the below section to the top section and extended, if needed.

For finalizing the top section installation, the rest of the CTU components may be installed in the final headroom 1" as shown in FIGS. 16 and 17, such as the elevator hoisting machine 30 and the rope suspenders 32 supported by the guide rails, and hoistway 1 top electrification and other components to their final positions. The installation platform overspeed governor may be replaced with the final elevator car OSG 16, 17 and moved from the hoistway ceiling 1' to be supported by the guide rail 8.

If necessary, CTU components used during installation may be replaced, for example overspeed governor OSG 16, the car safety gear, the at least one counterweight pulley 13", the car pulley beam 34.

The suspension ropes 31 may be installed as shown for example in FIG. 17.

The hoist device such as the man riding hoist **6*a* may be detached from the car 10 and taken out of the hoistway 1. The automatic safety gear trigger (ASGT) may be detached from the car 10. The material hoist may be removed from the ceiling 1'**.

Final compensation chains may be installed for the full travel of the elevator by extending the below section compensation chain or using a new one.

FIG. 11 shows preferred details of a passage of a suspension roping in case of an elevator with a machine room 50. The elevator is ready for construction time use for the full height of the building 100. In case of the machine room elevator the mechanical components are installed in the machine room 50 above the hoistway 1, such as the elevator hoisting machine 51 and the rope suspenders 32. On each of the rope suspenders 32, an end of a suspension roping 31 can be fixed. The suspension ropes 31 pass from the first rope suspender 32 downwards to at least one car pulley 33. The at least one car pulley 33 may be positioned on top of the car or at the outer ends of a pulley beam 34 which may be skewed extending across the sling bottom beam or across the sling top beam of the car 10. The skewed pulley beam may extend in the horizontal direction. The suspension ropes 31 pass after the at least one car pulley 33 upwards to wheels of the elevator hoisting machine 51 and further downwards to the at least one CWT pulley 13". The suspension ropes 31 pass after the at least one CWT pulley 13" finally upwards to the second rope suspender 32. The counterweight 13 is hanging from the counterweight pulley 13".

After the final top section mechanics and electronics installation and safety inspection, the elevator from the bottom up to the top section of the hoistway 1 is ready for commissioning for the construction time use until the final handover.

According to a preferred embodiment, the overspeed governor OSG 16 used during construction time may be replaced with a final OSG.

According to a preferred embodiment, the at least one counterweight pulley 13" used during construction time may be replaced with a final counterweight pulley.

According to a preferred embodiment, the car pulley beam 34 used during construction time may be replaced with a final car pulley beam.

According to a preferred embodiment, the construction time elevator hoisting machine 30 used during construction time may be replaced with a final elevator hoisting machine.

According to a preferred embodiment, the construction time signalization used during construction time may be replaced with a final signalization.

It will be obvious to a person skilled in the art that, as the technology advances, the inventive concept can be implemented in various ways. The invention and its embodiments are not limited to the examples described above but may vary within the scope of the claims.

The invention claimed is:

1. An elevator construction arrangement comprises a hoistway having a bottom section, a top section and at least one intermediate section between the bottom section and the top sections in a building, an elevator car, a counterweight, car guide rails for guiding the elevator car, counterweight guide rails for guiding the counterweight, an elevator hoisting machine and a suspension roping arranged to suspend the elevator car and the counterweight during construction time use of the elevator car, an installation platform configured to be guided on the car guide rails during installation of at least one hoistway section, a hoist device configured to hoist a working platform, the working platform including the elevator car or at least parts of the elevator car or the installation platform in the bottom section, device configured to hoist the working platform in hoistway sections above the bottom section, the hoist device comprises a man riding hoist attachable to the elevator car or the installation platform, and a hoist rope attachable to the elevator car or the installation platform and movable with the hoist device during elevator installation, at least one protection in deck mounted within the hoistway during the elevator installation in a section of the hoistway, the at least one protection deck including a cover and a frame, the at least one protection deck extending over and across the hoistway above the hoist device to shelter the hoistway below the at least one protection decks, a material hoist mounted above the at least one protection deck, the material hoist configured to move a material rope, the material rope extending through the at least one protection deck, and a hoisting point configured to support the working platform via the hoist device and the hoist rope; wherein during the elevator installation in the bottom section the hoisting point is supported by a first protection deck, and the working platform guided on the car guide rails serves as the installation platform, after the elevator installation in each of the top section, the bottom section, and the at least one intermediate section, the elevator car during the construction time use is movable by the elevator hoisting machine suspending the elevator car and the counterweight together with the suspension roping, and during the construction time use of the elevator car, the installation platform is configured to serve as another installation platform for an above section installation.

2. The arrangement according to claim 1, wherein in a case of a machine-room-less elevator, the elevator hoisting machine installed at a top of the hoistway supported by at least one of the car guide rails, and rope suspenders for fixing ends of the suspension roping are supported by the counterweight guide rails, and in a case of a machine room elevator, the elevator hoisting machine used for moving the elevator car for full height of an elevator travel and the rope suspenders for fixing an end of the suspension roping are in a machine room.

3. The arrangement according to claim 1, wherein the elevator hoisting machine is a construction time elevator hoisting machine or a final elevator hoisting machine to be finally installed in the top section of the hoistway or a machine room.

4. A method for installing an elevator during construction of a building comprising providing an elevator car, a counterweight, car guide rails for guiding the elevator car, counterweight guide rails for guiding the counterweight, an elevator hoisting machine and a suspension roping for suspending the elevator car and the counterweight during construction time use of the elevator car, mounting at least one protection deck within a hoistway having a bottom section, a top section and an at least one intermediate section between the bottom section and the top sections in the building, for an elevator section installation, the at least one protection deck including a cover and a frame, the at least one protection deck extending over and across the hoistway to shelter the hoistway below the at least one protection deck, providing an installation platform to be guided on the car guide rails during installation of at least one hoistway section, providing a hoist device, providing a material hoist mounted above the at least one protection deck, the material hoist configured to move a material rope, the material rope extending through the at least section deck, guiding the elevator car or at least parts of the elevator car as a working platform, or the installation platform used as the working platform on the car guide rails and the counterweight on the counterweight guide rails installed at a bottom of the hoistway, attaching to the working platform the hoist device comprising a man riding hoist and a hoist rope, providing a hoisting point to support the working platform via the hoist device and the hoist rope, wherein the method comprises mounting the hoisting point to a first protection deck for bottom section elevator installation, and installing elevator components in the bottom section using the working platform as the installation platform, after each section elevator installation, moving the elevator car during t construction time use by the elevator hoisting machine suspending the elevator car and the counterweight together with the suspension roping, and during the construction time use of the elevator car, using the installation platform as another installation platform for an above section installation.

5. The method according to claim 4, comprising moving the elevator car during construction time after the hoisting point and the hoist device are removed from the bottom section, or after the hoisting point, the hoist device and the installation platform are removed from the installed hoistway section.

6. The method according to claim 4, comprising installing the elevator hoisting machine, supported by at least one of the car guide rails at a top of the bottom section, and installing the suspension roping to suspend the elevator car and the counterweight, and moving the elevator car during the construction time use in the bottom section, after the hoist device, or after the hoist device and the installation platform, is removed from the bottom section.

7. The method according to claim 4, comprising, during the elevator installation in the at least one intermediate section, mounting the hoisting point to an upper second protection deck, attaching to the installation platform the hoist device and the hoist rope, and using the installation platform as the installation platform, and after the intermediate section installation, installing the elevator hoisting machine, supported by the car guide rails at a top of the intermediate section, and installing an extended suspension roping to suspend the elevator car and the counterweight, and moving the elevator car during the construction time use in the intermediate section, after the hoist device and the installation platform are removed from the intermediate section.

8. The method according to claim 4, comprising during the elevator installation in the top section, moving the hoisting point to a ceiling of the hoistway.

9. The method according to claim 4, comprising hoisting construction material below the at least one protection deck by the material hoist, and hoisting the car guide rails and the counterweight guide rails and other heavy elevator components by the material hoist.

10. The method according to claim 4, comprising suspending an overspeed governor by the at least one protection deck during the bottom section and intermediate section installations and by a structure of the building including a ceiling or a machine room during a top section installation, and in case of a machine-room-less elevator, moving the overspeed governor from the ceiling to at least one of the car guide rails opposite another one of the car guide rails supporting the elevator hoisting machine.

11. The method according to claim 4, comprising installing guide rails through the cover on an upper sider of the at least one protection deck.

12. The method according to claim 4, comprising starting the elevator installation in the top section after the building is in full height, and/or starting the elevator installation in the top section after a ceiling is closed.

13. The method according to claim 4, comprising, in a case of a machine-room-less elevator, supporting the elevator hoisting machine at a top of the hoistway by at least one of the car guide rails, and supporting rope suspenders for fixing ends of the suspension roping by the counterweight guide rails, or in a case of a machine room elevator, installing the elevator hoisting machine used for moving the elevator car for full height of an elevator travel and the rope suspenders for fixing an end of the suspension roping in a machine room.

14. The method according to claim 4, comprising taking a below section elevator out of the construction time use to extend an elevator travel by moving below section top components to a headroom of an above section.

15. The method according to claim 14, wherein taking the below section elevator out of the construction time use comprises removing the suspension roping, the elevator hoisting machine and a headroom electrification from a below section.

* * * * *